(12) United States Patent
Sawaya et al.

(10) Patent No.: US 12,244,746 B2
(45) Date of Patent: Mar. 4, 2025

(54) WIRELESS COMMUNICATION APPARATUS AND VEHICLE

(71) Applicants: TOYOTA JIDOSHA KABUSHIKI KAISHA, Toyota (JP); DENSO TEN Limited, Hyogo (JP)

(72) Inventors: Takuma Sawaya, Nagoya (JP); Hironobu Yamamoto, Toyota (JP); Noriaki Ito, Toyota (JP); Hiroki Kawasaki, Toyota (JP); Hiroto Nakagawa, Nagoya (JP); Satoru Ikeda, Hyogo (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 325 days.

(21) Appl. No.: 17/706,950

(22) Filed: Mar. 29, 2022

(65) Prior Publication Data

US 2022/0321684 A1 Oct. 6, 2022

(30) Foreign Application Priority Data

Mar. 31, 2021 (JP) ................ 2021-061807

(51) Int. Cl.
*H04W 4/48* (2018.01)
*H04B 1/3822* (2015.01)
*H04M 1/02* (2006.01)
*H04W 4/40* (2018.01)

(52) U.S. Cl.
CPC ............ *H04M 1/026* (2013.01); *H04W 4/40* (2018.02)

(58) Field of Classification Search
CPC . H04M 1/026; H04M 1/724098; H04W 4/40; H04W 4/48; H04B 1/082; H04B 1/3822; H01Q 1/3291; H01Q 1/22; H01Q 21/28
See application file for complete search history.

(56) References Cited

U.S. PATENT DOCUMENTS

| | | | | |
|---|---|---|---|---|
| 9,520,005 | B2 * | 12/2016 | Banet | G07C 5/00 |
| 2003/0020602 | A1 * | 1/2003 | Hata | G08G 1/20 340/901 |
| 2011/0140975 | A1 | 6/2011 | Shigetomi | |
| 2015/0077225 | A1 * | 3/2015 | Proefke | G07C 9/00182 340/5.72 |
| 2017/0187101 | A1 | 6/2017 | Freeman et al. | |
| 2018/0086306 | A1 * | 3/2018 | Schmotzer | B60R 25/102 |
| 2018/0138966 | A1 * | 5/2018 | Ishiko | H04B 7/1555 |
| 2018/0175492 | A1 * | 6/2018 | Sasaki | H01Q 1/3208 |
| 2018/0270640 | A1 * | 9/2018 | Iwata | G08B 25/016 |
| 2018/0319402 | A1 * | 11/2018 | Mills | B60W 10/04 |

(Continued)

FOREIGN PATENT DOCUMENTS

| | | |
|---|---|---|
| CN | 105929729 A | 9/2016 |
| JP | 2011-035652 A | 2/2011 |

(Continued)

*Primary Examiner* — Andrew Wendell
(74) *Attorney, Agent, or Firm* — Sughrue Mion, PLLC

(57) ABSTRACT

A wireless communication apparatus comprises a communication module configured to perform wireless communication with a network outside a vehicle; and a first antenna connected to the communication module, wherein the wireless communication apparatus is mounted inside an instrument panel of the vehicle.

16 Claims, 7 Drawing Sheets

(56) References Cited

U.S. PATENT DOCUMENTS

| | | | | |
|---|---|---|---|---|
| 2018/0368030 A1* | 12/2018 | Hrabak | ............. | H04W 36/0005 |
| 2019/0003215 A1* | 1/2019 | Stoia | ....................... | E05B 81/80 |
| 2021/0273956 A1* | 9/2021 | Nishimoto | ............ | H04L 67/562 |

FOREIGN PATENT DOCUMENTS

| | | |
|---|---|---|
| JP | 2011-130115 A | 6/2011 |
| JP | 2019-505119 A | 2/2019 |

* cited by examiner

WIRELESS COMMUNICATION APPARATUS AND VEHICLE

CROSS REFERENCE TO THE RELATED APPLICATION

This application claims the benefit of Japanese Patent Application No. 2021-061807, filed on Mar. 31, 2021, which is hereby incorporated by reference herein in its entirety.

BACKGROUND

Technical Field

The present disclosure relates to a wireless communication technology.

Description of the Related Art

A system according to which a computer mounted in a vehicle performs wireless communication is widely used.

In relation to this, Japanese Patent Laid-Open No. 2011-130115 discloses a technique related to an arrangement position of a communication antenna that is mounted in the vehicle, for example.

SUMMARY

The present disclosure is aimed at increasing wireless signal transmission efficiency.

The present disclosure in its one aspect provides a wireless communication apparatus comprising a communication module configured to perform wireless communication with a network outside a vehicle; and a first antenna connected to the communication module, wherein the wireless communication apparatus is mounted inside an instrument panel of the vehicle.

The present disclosure in its another aspect provides a vehicle comprising a wireless communication apparatus that is mounted inside an instrument panel, the wireless communication apparatus including a communication module configured to perform wireless communication with an external network; and a first antenna connected to the communication module.

According to the present disclosure, wireless signal transmission efficiency may be increased.

DESCRIPTION OF THE EMBODIMENTS

Figure 1:
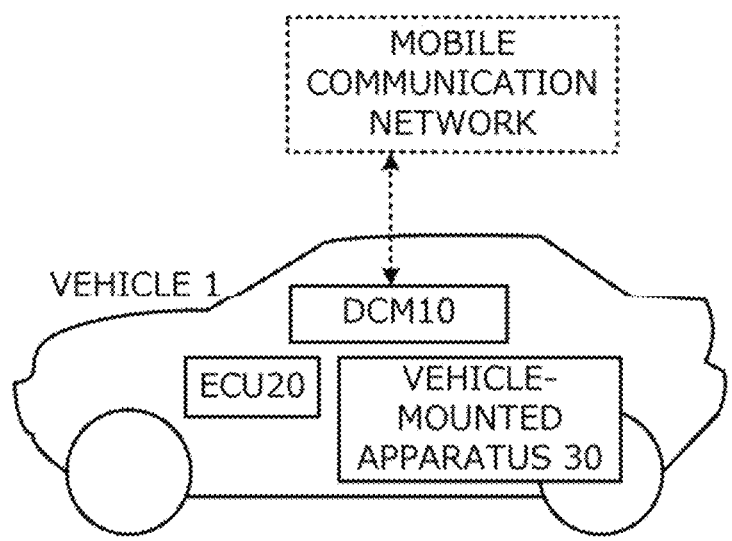
FIG. 1 is a schematic diagram illustrating an example configuration of a vehicle system according to an embodiment.

A growing number of vehicles include a data communication terminal mounted therein. Furthermore, these days, vehicle functions are being improved, thereby resulting in an increase in the amount of communication data, and there is a demand for increasing communication efficiency.

A wireless communication apparatus according to an embodiment of the present disclosure includes a communication module configured to perform wireless communication with a network outside a vehicle; and a first antenna connected to the communication module, where the wireless communication apparatus is to be mounted inside an instrument panel of the vehicle.

The wireless communication apparatus performs input/output of wireless signals via the antenna. The antenna is desirably disposed at a position that is not affected by a body that is made of metal. Accordingly, a method is generally adopted according to which the antenna is disposed near a windshield, and the antenna and a main body where the communication module is stored are connected by a coaxial cable.

However, such a configuration possibly entails problems such as an increase in cost due to use of the coaxial cable, and a reduction in signal gain.

In view of such a situation, the communication module and the antenna of the wireless communication apparatus according to the present disclosure are housed in a same housing, and the housing is mounted inside the instrument panel of the vehicle. The instrument panel is a panel, at a front of the vehicle, where instrumentation is disposed. By disposing the apparatus inside the instrument panel, the antenna may be disposed at a position close to outside the vehicle, and also, a distance between the antenna and the communication module may be minimized.

The communication module and the first antenna may be held in a same housing, and the housing may include a connection part for connection to the instrument panel.

By housing the communication module and the first antenna in the same housing, the length of a cable for connecting the two may be minimized. Additionally, the housing does not have to have a shape that completely encases the communication module and the first antenna so long as the two can be held. The connection part is a member for fixing (by screwing, for example) the housing to the instrument panel.

Furthermore, the communication module may be a module that is capable of the wireless communication by at least cellular communication.

For example, the communication module may perform data communication by using a mobile telephone network or a mobile communication network.

Furthermore, the wireless communication apparatus may be configured to be capable of communicating with a plurality of electronic control modules of the vehicle, and may relay communication performed by the plurality of electronic control modules.

The electronic control module is an electronic control unit (ECU) mounted in the vehicle, for example. Communication to be relayed may be communication that is completed inside the vehicle or may be communication for connecting inside and outside of the vehicle. In the case of the latter, the wireless communication apparatus may perform transmission/reception of data with an external network, via a built-in communication module.

Furthermore, the wireless communication apparatus may provide a predetermined service that uses the wireless communication.

Furthermore, the wireless communication apparatus may further include an auxiliary battery that is used in a case where power supply from the vehicle is interrupted.

As the predetermined service, a service with a high degree of importance, such as an emergency report service or a security monitoring service, may be cited, for example. The wireless communication apparatus may provide such a service by itself (that is, without using other electronic control modules). By enabling an important service to be independently provided, the service can be continued to be provided even if the vehicle is damaged.

Furthermore, the predetermined service may include a service of transmitting location information on the wireless communication apparatus.

Furthermore, the wireless communication apparatus may further include a second antenna configured to receive a signal transmitted from positioning satellites.

The positioning satellites are satellites of a global navigation satellite system (GNSS), for example. The second antenna that receives signals from satellites may be held in the same housing as the first antenna.

Furthermore, the first antenna and the second antenna may have different directivity axes.

The second antenna is preferably directed to the sky above (that is, in a vertical direction), but this does not apply to the first antenna. Accordingly, by disposing the antennas with the directivity axes shifted from each other, a space inside the housing may be effectively used.

Furthermore, the wireless communication apparatus may further include a connection port that connects the communication module to an extension antenna.

According to such a configuration, intensity of a wireless signal may be increased.

In the following, specific embodiments of the present disclosure will be described with reference to the drawings. A hardware configuration, a module configuration, a functional configuration and the like described in each embodiment are not intended to limit the technical scope of the disclosure thereto unless stated otherwise.

First Embodiment

An outline of a vehicle system according to a first embodiment will be given with reference to FIG. 1. The vehicle system according to the present embodiment includes a vehicle 1.

The vehicle 1 is a connected car including a function of communicating with an external apparatus. The vehicle 1 includes a data communication module (DCM) 10, a plurality of electronic control units 20 (ECUs), and a vehicle-mounted apparatus 30.

The DCM 10 is an apparatus that performs wireless communication with another apparatus (or an external network) via a network. The DCM 10 functions as a gateway for connecting a component (hereinafter "vehicle component") of the vehicle 1 to a network outside the vehicle. For example, the DCM 10 provides the ECUs 20 or the vehicle-mounted apparatus 30 of the vehicle 1 with access to an external network. The plurality of ECUs 20 or the vehicle-mounted apparatus 30 mounted in the vehicle may thus communicate with an external apparatus via the DCM 10.

The amount of communication data to be handled by the DCM that is mounted in the vehicle is expected to increase in the future as vehicle functions improve. Accordingly, there is a demand for increasing communication efficiency of the DCM.

Accordingly, with the DCM 10 according to the present embodiment, the antenna and the communication module are housed in the same housing and are installed at a position suitable for transmission/reception of wireless signals. A cable for connecting the communication antenna and the communication module may thus be made as short as possible, and efficient communication may be realized. A specific arrangement method will be described later.

Figure 2:
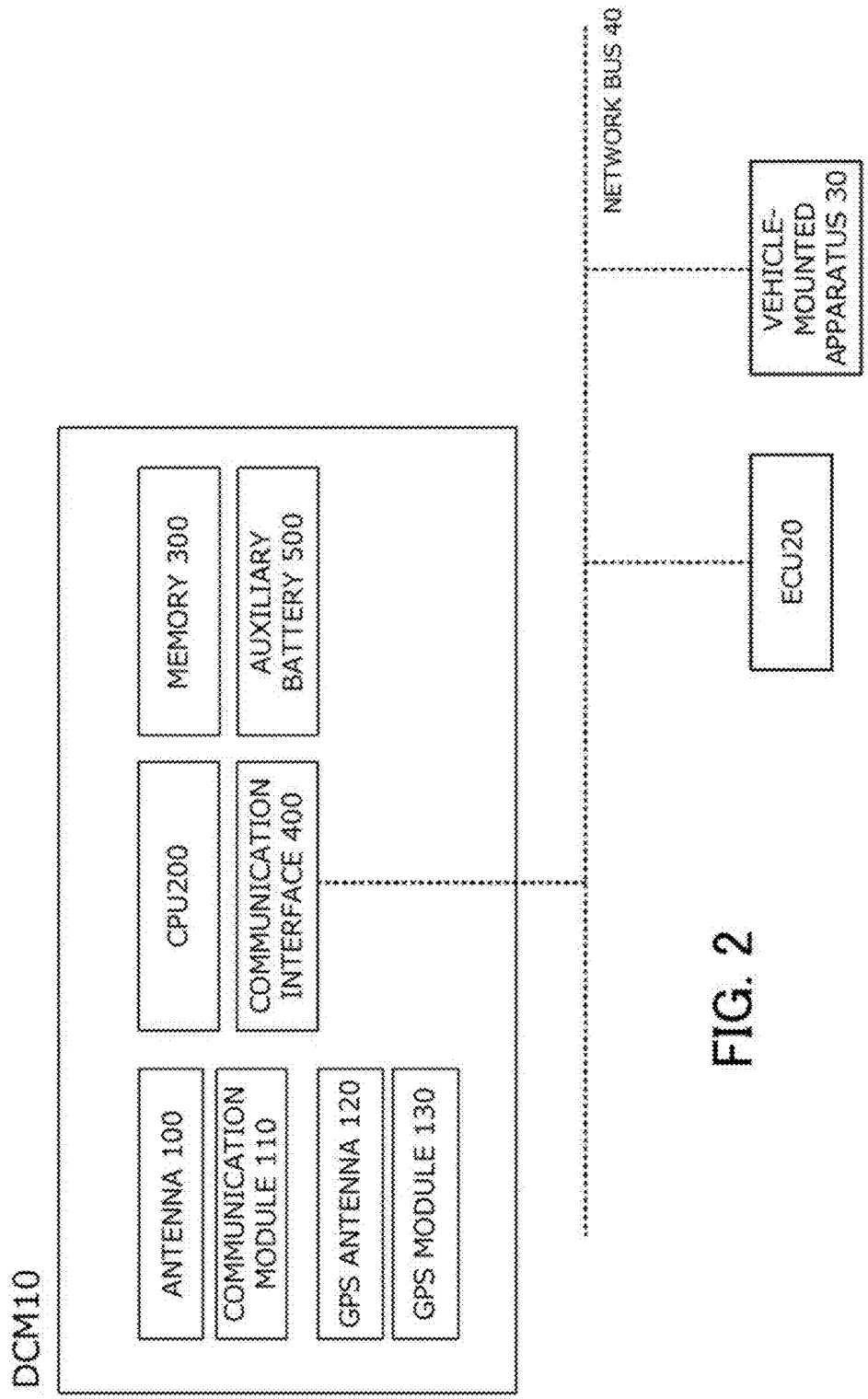
FIG. 2 is a schematic diagram illustrating an example configuration of a DCM and vehicle components.

FIG. 2 is a diagram for describing structural elements of the DCM 10 according to the present embodiment. The DCM 10 according to the present embodiment includes an antenna 100, a communication module 110, a GPS antenna 120, a GPS module 130, a CPU 200, a memory 300, a communication interface 400, and an auxiliary battery 500.

The antenna 100 is an antenna element that performs input/output of wireless signals. In the present embodiment, the antenna 100 is compatible with cellular communication (for example, mobile communication such as 3G, LTE or 5G). Additionally, the antenna 100 may include a plurality of physical antennas. For example, in the case of performing mobile communication using radio waves in a high frequency band, such as microwaves or millimeter waves, a plurality of antennas may be disposed in a distributed manner to stabilize communication.

The communication module 110 is a communication module for performing mobile communication.

The GPS antenna 120 is an antenna that receives positioning signals transmitted from positioning satellites (also referred to as "GNSS satellites").

The GPS module 130 is a module that calculates location information based on signals received by the GPS antenna 120.

The CPU 200 is an arithmetic unit that implements various functions of the DCM 10 by executing predetermined programs.

The memory 300 is a memory device that includes a main memory and an auxiliary memory. The auxiliary memory stores an operating system (OS), various programs, various tables and the like, and functions matching predetermined objects as described later may be implemented by loading the programs stored in the auxiliary memory into the main memory and by executing the same.

The CPU 200 executes a function of relaying communication that is performed between an external network and a component (a vehicle component) of the vehicle 1. For example, in the case where a certain vehicle component needs to perform communication with an external network, the CPU 200 executes a function of relaying data transmitted from the vehicle component to the external network. Furthermore, the CPU 200 executes a function of receiving data transmitted from an external network and of transferring the data to an appropriate vehicle component.

The CPU 200 may further execute a function unique to the wireless communication apparatus. For example, the CPU 200 is capable of executing a monitoring function of a security system or a call function, and of making a security report, an emergency report or the like based on a trigger occurring inside the vehicle.

The communication interface 400 is an interface unit for connecting the DCM 10 to an in-vehicle network. In the present embodiment, a plurality of vehicle components including the electronic control units (the ECUs 20) are interconnected by a network bus 40. For example, a controller area network (CAN) may be cited as an example of a standard for the in-vehicle network. Additionally, in the case where the in-vehicle network uses a plurality of standards, the communication interface 400 may include a plurality of interface devices according to the standards of communication destinations. For example, Ethernet® or the like may be cited as an example of a communication standard other than CAN.

The auxiliary battery 500 is a battery that supplies backup power to the DCM 10. The DCM 10 operates on power supplied from the vehicle 1, but supply of power may sometimes be cut off due to a traffic accident or an illicit act, for example. The auxiliary battery 500 supplies power to the DCM 10 in such a case. The DCM 10 may thus continue to operate even in times of emergency. Additionally, the auxiliary battery 500 may be charged when power is being supplied from the vehicle 1.

Figure 3:
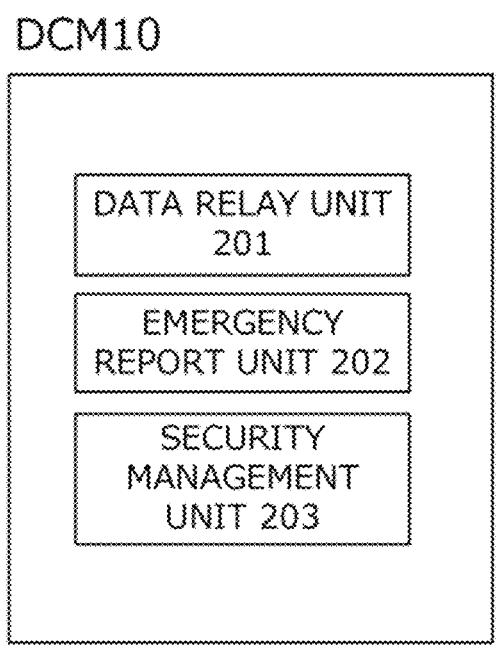
FIG. 3 is a block diagram schematically illustrating an example functional configuration of the DCM.

Next, functions to be executed by the CPU 200 will be described. FIG. 3 is a diagram for describing functional modules of the DCM 10. The functional modules illustrated may be implemented by the CPU 200 executing programs stored in storage unit such as a ROM.

A data relay unit 201 relays data that is transmitted/received between vehicle components, and for example, performs a process of receiving a message that is transmitted by a first apparatus connected to the in-vehicle network and of transferring the message, as necessary, to a second apparatus connected to the in-vehicle network. The first and second apparatuses may be the ECUs 20, the vehicle-mounted apparatus 30, or other vehicle components.

Furthermore, in the case where a message destined for an external network is received from a vehicle component, the data relay unit 201 relays the message to the external network. Furthermore, the data relay unit 201 receives data transmitted from the external network, and transfers the data to an appropriate vehicle component.

In the case where an abnormal situation arises in the vehicle 1, an emergency report is made by an emergency report unit 202 to an operator outside the vehicle. Occurrence of a traffic accident or a vehicle breakdown may be cited as examples of the abnormal situation. For example, in the case where a predetermined trigger is issued, such as when a call button provided in the vehicle is pressed or an air bag is inflated, the emergency report unit 202 starts connection to the operator, and enables a call between an occupant of the vehicle and the operator. Additionally, at the time of reporting emergency, the emergency report unit 202 may transmit location information on the vehicle to the operator. In this case, the emergency report unit 202 may acquire the location information from the GPS module 130.

A security management unit 203 performs a security monitoring process. For example, the security management unit 203 detects that the vehicle is unlocked without a regular procedure, based on data received from the ECU 20 managing an electronic lock of the vehicle, and transmits a security report to a predetermined apparatus. Additionally, the security report may include the location information on the vehicle. In this case, the security management unit 203 may acquire the location information from the GPS module 130. In the case of determining occurrence of a problem in relation to security of the vehicle 1, the security management unit 203 may acquire the location information, and periodically transmit the acquired location information to an external apparatus specified in advance.

The ECU 20 is an electronic control unit that controls a component of the vehicle 1. Additionally, the present example illustrates one ECU 20, but a plurality of ECUs 20 may be included in the vehicle 1. The plurality of ECUs 20 control components of different systems, such as an engine system, an electrical system and a powertrain system, for example. The ECU 20 includes a function of generating a specified message, and of periodically transmitting/receiving the same via the in-vehicle network. Furthermore, the ECU 20 may provide a remote service (such as a remote air-conditioning service) or the like by communicating with an external apparatus via the DCM 10.

Like the DCM 10, the ECU 20 may be a computer including a processor such as a CPU and a GPU, a main memory such as a RAM and a ROM, and an auxiliary memory such as an EPROM, a disk drive and a removable medium.

The vehicle-mounted apparatus 30 is an apparatus (such as a car navigation apparatus) that provides information to an occupant of the vehicle. The vehicle-mounted apparatus 30 is referred to also as a car navigation system, an infotainment system or a head unit.

The vehicle-mounted apparatus 30 is capable of providing navigation or entertainment to an occupant of the vehicle. Furthermore, the vehicle-mounted apparatus 30 includes a function of downloading traffic information, road map data, music, moving image and the like by communicating with an external network of the vehicle 1 via the DCM 10.

Like the DCM 10, the vehicle-mounted apparatus 30 may be a computer including a processor such as a CPU and a GPU, a main memory such as a RAM and a ROM, and an auxiliary memory such as an EPROM, a disk drive and a removable medium.

The network bus 40 is a communication bus included in the in-vehicle network. Additionally, in the present example, one bus is illustrated as an example, but the vehicle 1 may include two or more communication buses. A plurality of communication buses may be interconnected by the DCM 10 or a gateway coordinating the plurality of communication buses.

Figure 4:
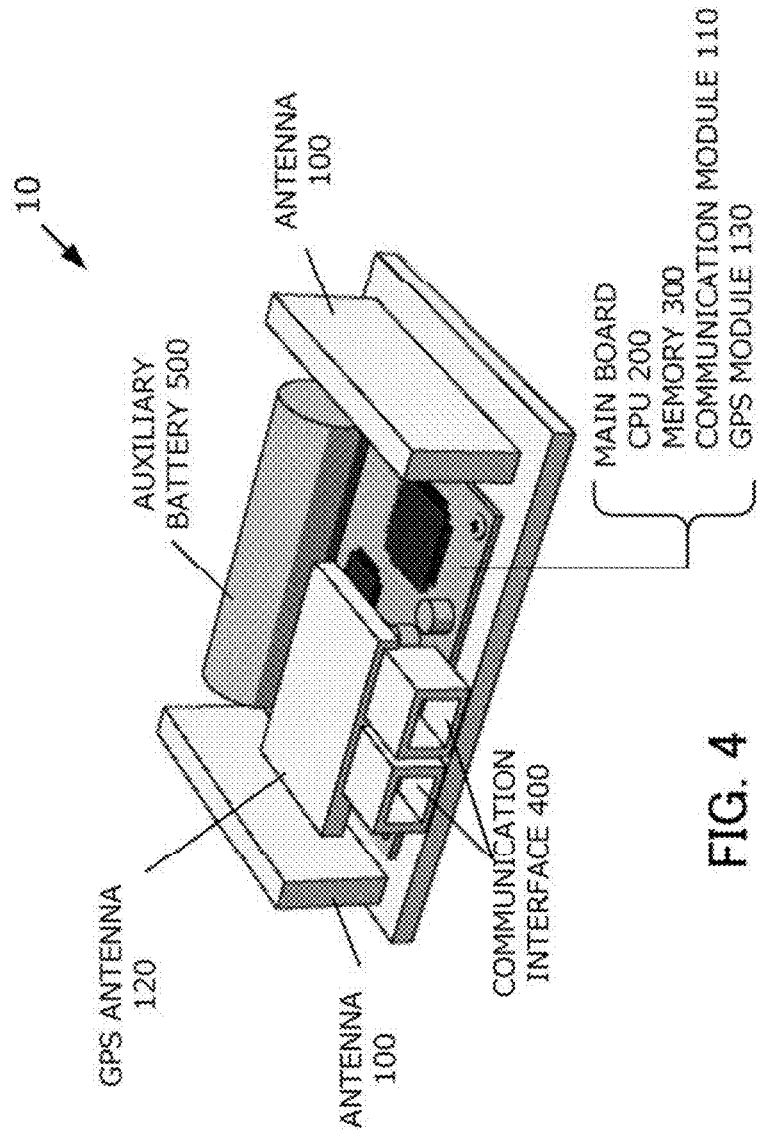
FIG. 4 is a hardware external view of the DCM.

FIG. 4 is a view of an appearance of hardware of the DCM 10.

The hardware of the DCM 10 includes a main board, the antenna 100, the GPS antenna 120, and the auxiliary battery 500.

The main board is a board where the CPU 200, the memory 300, the communication module 110, the GPS module 130, and the communication interface 400 are mounted.

In the present example, the antenna 100 includes two physical antennas. Furthermore, the GPS antenna 120 is disposed with a directivity axis along the vertical direction. Additionally, the antenna 100 and the GPS antenna 120 may be disposed with directivity axes facing different directions. A space inside the housing may thus be effectively used.

Furthermore, in the present example, the communication interface 400 includes a plurality of connectors. One of the plurality of connectors is compatible with an in-vehicle network bus such as CAN or Ethernet. Furthermore, another connector may be a connector for extension. As such a connector, a port for connecting an external antenna to the DCM 10, an USB port for connecting an external appliance (such as a terminal for maintenance) to the DCM 10, and the like may be cited as examples.

Figure 5:
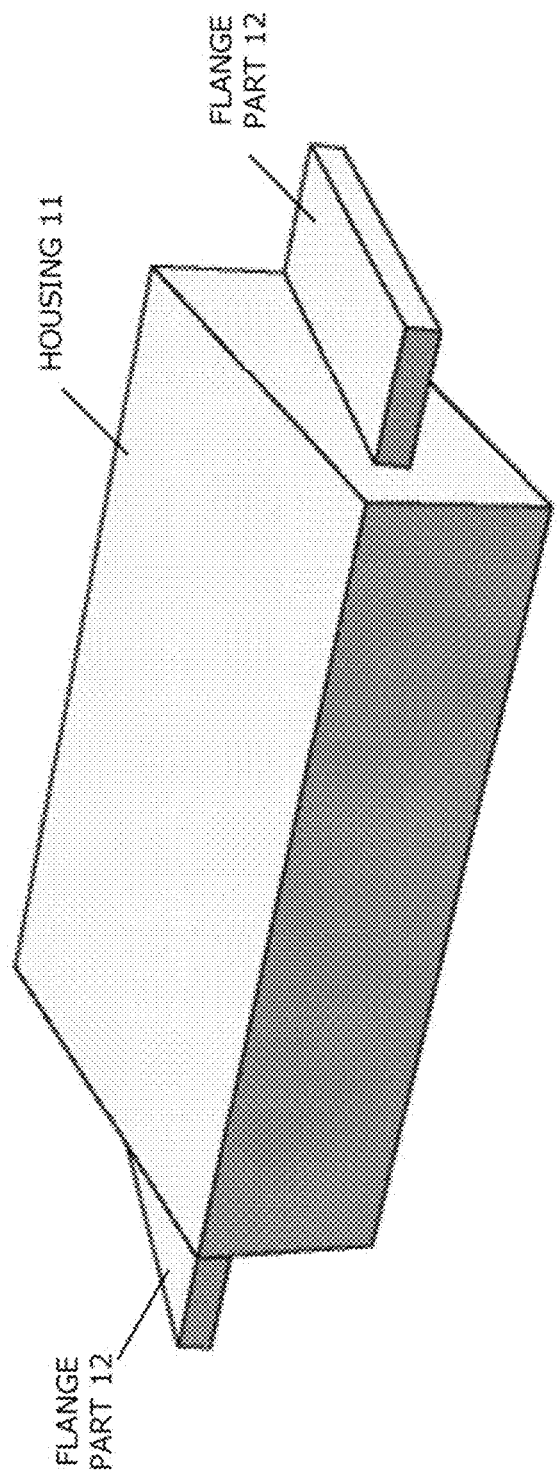
FIG. 5 is an external view of a housing of the DCM.

The hardware illustrated in FIG. 4 is housed in one housing. FIG. 5 is a view of an appearance of a housing 11 for housing the components illustrated in FIG. 4. The housing 11 includes flange parts 12. The flange parts 12 are members for fixing the housing 11 to the vehicle 1.

Figure 6:
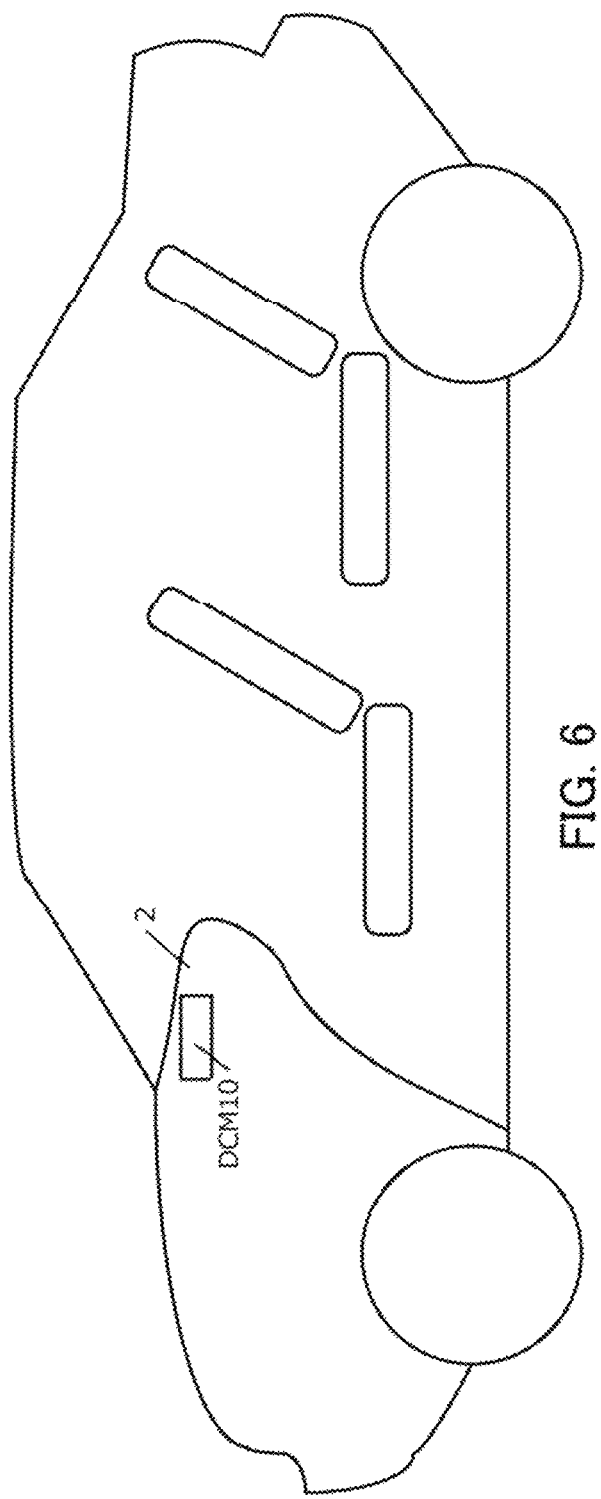
FIG. 6 is a diagram for describing a fixing position of the DCM inside a vehicle.

FIG. 6 is a schematic view for describing an arrangement position of the DCM 10 inside the vehicle. A reference sign 2 is the panel (the instrument panel) that is disposed at a front of the vehicle and that houses instrumentation. As illustrated in the drawing, the DCM 10 according to the present embodiment is disposed at an upper part of the instrument panel, at a position that is in contact from an inner side. Additionally, in relation to a left-right direction of the vehicle, the arrangement position may be on the passenger seat side, at a center, or on the driver seat side.

Figure 7:
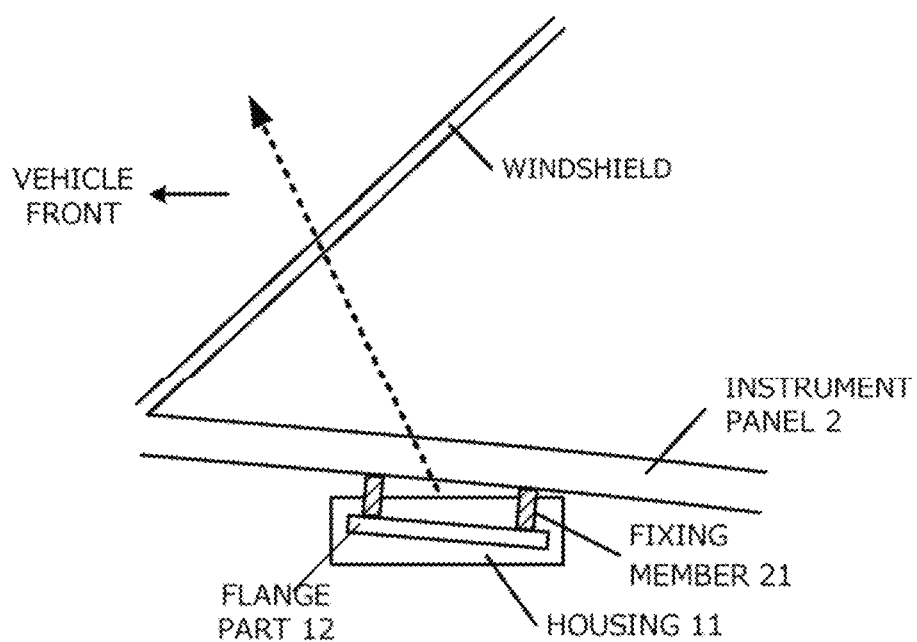
FIG. 7 is an enlarged view for describing the fixing position of the DCM inside the vehicle.

FIG. 7 is an enlarged view for describing a mounting position of the DCM 10.

As illustrated in the drawing, in the present embodiment, the flange parts 12 of the housing of the DCM 10 are fixed inside the instrument panel 2 by fixing members 21. The flange part 12 and the fixing member 21 may be structured in any way as long as the two can be coupled together. For example, the flange part 12 and the fixing member 21 may include screw holes to be coupled together by a screw or a bolt.

By fixing the DCM 10 at such a position, the distance between the antenna 100 (and the GPS antenna 120) and outside the vehicle may be made small.

With a conventional DCM, the main board and the antenna 100 are connected by a coaxial cable. For example, the housing where the antenna 100 is housed is disposed inside the instrument panel 2, and the cable has to be routed to a DCM main body (a housing where the main board is housed).

Conventionally, the main body of the DCM is disposed at a position where other ECUs 20 are stored, such as at a back of a glove compartment, under a seat, inside a center console, or in an engine compartment, for example. According to such a configuration, a signal loss is caused due to presence of the cable, and an amplifier has to be additionally provided to compensate for such a loss, for example.

By contrast, the DCM 10 according to the present embodiment does not need a separate cable for connecting the antenna and the main board. That is, wireless signal transmission efficiency may be increased. Accordingly, a cable and an amplifier for compensating for transmission loss become unnecessary, and a manufacturing cost of the appliance may be reduced.

Modification of First Embodiment

The embodiment described above is merely an example, and the present disclosure may be modified and practiced as appropriate without departing from the scope of the disclosure.

For example, in the first embodiment, a communication module that uses one cellular communication standard is cited as an example, but a plurality of sets of communication module and antenna compatible with a plurality of communication standards may be mounted on the DCM 10.

Furthermore, the DCM 10 may be capable of wireless communication using a communication method other than cellular communication. As such a communication method, Wi-Fi®, Bluetooth®, inter-vehicle communication, road-to-vehicle communication and V2X communication that use dedicated short range communications (DSRC), and the like may be cited.

Furthermore, in the first embodiment, the housing 11 of the wireless communication apparatus is fixed to the instrument panel 2 by the fixing member 21, but the wireless communication apparatus does not necessarily have to be in contact with the instrument panel as long as it is disposed inside the instrument panel.

What is claimed is:

1. A wireless communication apparatus comprising:
   a housing including a structure independent of a vehicle, and a connection part thereon;
   a communication module provided in the housing and configured to perform wireless communication with a network outside a vehicle;
   a first antenna including two physical antennas provided in the housing and connected to the communication module; and
   an auxiliary battery provided in the housing and used in a case where power supply from the vehicle is interrupted, wherein
      the wireless communication apparatus is mounted inside an instrument panel of the vehicle through the connection part of the housing,
      the two physical antennas are disposed along a first direction at opposite ends within the housing, and
      the auxiliary battery is disposed along a second direction perpendicular to the first direction, and between the two physical antennas.

2. The wireless communication apparatus according to claim 1, wherein
   the communication module is a module that is capable of the wireless communication by at least cellular communication.

3. The wireless communication apparatus according to claim 1, wherein
   the wireless communication apparatus is configured to be capable of communicating with a plurality of electronic control modules of the vehicle, and
   the wireless communication apparatus relays communication performed by the plurality of electronic control modules.

4. The wireless communication apparatus according to claim 3, wherein
   a predetermined service that uses the wireless communication is provided.

5. The wireless communication apparatus according to claim 4, wherein
   the predetermined service includes a service of transmitting location information on the wireless communication apparatus.

6. The wireless communication apparatus according to claim 5, further comprising
   a second antenna provided in the housing and configured to receive a signal transmitted from a positioning satellite.

7. The wireless communication apparatus according to claim 6, wherein
   the first antenna and the second antenna have different directivity axes.

8. The wireless communication apparatus according to claim 1, further comprising
   a connection port that connects the communication module to an extension antenna.

9. A vehicle comprising a wireless communication apparatus that is mounted inside an instrument panel, the wireless communication apparatus including:
   a housing including a structure independent of a vehicle, and a connection part thereon;
   a communication module provided in the housing and configured to perform wireless communication with an external network;
   a first antenna including two physical antennas provided in the housing and connected to the communication module; and
   an auxiliary battery provided in the housing that is used in a case where power supply from the vehicle is interrupted, wherein
      the wireless communication apparatus is mounted inside the instrument panel of the vehicle through the connection part of the housing, the two physical antennas are disposed along a first direction at opposite ends within the housing, and the auxiliary battery is disposed along a second direction perpendicular to the first direction, and between the two physical antennas.

10. The vehicle according to claim 9, wherein the communication module of the wireless communication apparatus is a module that is capable of the wireless communication by at least cellular communication.

11. The vehicle according to claim 9, wherein the wireless communication apparatus is configured to be capable of communicating with a plurality of electronic control modules, and the wireless communication apparatus relays communication performed by the plurality of electronic control modules.

12. The vehicle according to claim 11, wherein the wireless communication apparatus provides a predetermined service that uses the wireless communication.

13. The vehicle according to claim 12, wherein the predetermined service includes a service of transmitting location information on the wireless communication apparatus.

14. The vehicle according to claim 13, wherein the wireless communication apparatus further includes a second antenna provided in the housing and configured to receive a signal transmitted from a positioning satellite.

15. The vehicle according to claim 14, wherein the first antenna and the second antenna have different directivity axes.

16. The vehicle according to claim 9, wherein the wireless communication apparatus further includes a connection port that connects the communication module to an extension antenna.

\* \* \* \* \*